United States Patent
Yano et al.

(10) Patent No.: US 7,026,035 B2
(45) Date of Patent: Apr. 11, 2006

(54) LAMINATED FILM FOR OPTICAL USE

(75) Inventors: Shinji Yano, Gifu (JP); Kouji Kubo, Gifu (JP); Makoto Handa, Gifu (JP); Tetsuo Ichihashi, Gifu (JP); Kei Mizutani, Gifu (JP); Shigeyuki Watanabe, Gifu (JP)

(73) Assignee: Teijin DuPont Films Japan Limited, Tokyo (JP)

( * ) Notice: Subject to any disclaimer, the term of this patent is extended or adjusted under 35 U.S.C. 154(b) by 6 days.

(21) Appl. No.: 10/491,920

(22) PCT Filed: Apr. 25, 2003

(86) PCT No.: PCT/JP03/05361

§ 371 (c)(1),
(2), (4) Date: Apr. 8, 2004

(87) PCT Pub. No.: WO03/093008

PCT Pub. Date: Nov. 13, 2003

(65) Prior Publication Data

US 2005/0019555 A1    Jan. 27, 2005

(30) Foreign Application Priority Data

May 2, 2002 (JP) .............................. 2002-130391
Jul. 11, 2002 (JP) .............................. 2002-202410

(51) Int. Cl.
B32B 27/06 (2006.01)
B32B 27/08 (2006.01)
B32B 27/18 (2006.01)
B32B 27/20 (2006.01)
B32B 27/36 (2006.01)

(52) U.S. Cl. ............... 428/141; 428/212; 428/323; 428/330; 428/331; 428/480; 428/694 SG; 528/275; 528/277; 528/279; 528/283; 528/285; 528/286; 528/287

(58) Field of Classification Search ................ 428/480, 428/910, 141, 323, 328, 329, 330, 331, 212
See application file for complete search history.

(56) References Cited

U.S. PATENT DOCUMENTS

| | | | | |
|---|---|---|---|---|
| 4,066,820 A | * | 1/1978 | Kelly et al. | 428/483 |
| 4,370,291 A | * | 1/1983 | Kazama et al. | 264/210.7 |
| 4,375,494 A | * | 3/1983 | Stokes | 428/323 |
| 4,526,847 A | * | 7/1985 | Walker et al. | 430/18 |
| 4,548,855 A | * | 10/1985 | Ono et al. | 428/147 |
| 5,076,976 A | * | 12/1991 | Aoki et al. | 264/484 |
| 5,316,714 A | * | 5/1994 | Yoneda et al. | 264/210.6 |
| 5,424,121 A | * | 6/1995 | Murakami et al. | 428/337 |
| 5,496,618 A | * | 3/1996 | Kurihara et al. | 428/198 |
| 5,648,159 A | * | 7/1997 | Sato | 428/327 |
| 5,776,604 A | * | 7/1998 | Lu et al. | 428/343 |
| 5,858,507 A | * | 1/1999 | Yoshida et al. | 428/141 |
| 5,880,201 A | * | 3/1999 | Enomoto et al. | 524/492 |
| 5,922,164 A | * | 7/1999 | Kimura et al. | 156/308.2 |
| 5,935,700 A | * | 8/1999 | Enomoto et al. | 428/330 |
| 5,993,958 A | * | 11/1999 | Okutsu | 428/338 |
| 6,083,617 A | * | 7/2000 | Aoyama et al. | 428/327 |
| 6,348,267 B1 | * | 2/2002 | Okajima | 428/423.7 |
| 6,365,659 B1 | * | 4/2002 | Aoyama et al. | 524/399 |
| 6,403,224 B1 | * | 6/2002 | Okajima et al. | 428/423.7 |
| 6,458,467 B1 | * | 10/2002 | Mizuno et al. | 428/480 |
| 6,482,501 B1 | * | 11/2002 | Mizuno et al. | 428/141 |
| 6,485,818 B1 | * | 11/2002 | Fujita | 428/220 |
| 6,670,030 B1 | * | 12/2003 | Uchida et al. | 428/323 |
| 6,713,641 B1 | * | 3/2004 | Weaver et al. | 552/254 |
| 2001/0055674 A1 | * | 12/2001 | Hellman et al. | 428/216 |
| 2004/0013892 A1 | * | 1/2004 | Yano et al. | 428/482 |
| 2004/0265539 A1 | * | 12/2004 | Hashimoto et al. | 428/141 |

FOREIGN PATENT DOCUMENTS

| | | |
|---|---|---|
| JP | 10-272678 A | 10/1998 |
| JP | 11-286092 A | 10/1999 |
| JP | 2001-138463 A | 5/2001 |
| JP | 2002-80621 A | 3/2002 |
| JP | 2003-119305 A | 4/2003 |

* cited by examiner

Primary Examiner—Vivian Chen
(74) Attorney, Agent, or Firm—Sughrue Mion, PLLC

(57) ABSTRACT

There is provided a laminated film for optical use comprising a polyester film which has a lubricity layer containing globular particles in at least one side thereof, wherein the laminated film has a thickness irregularity of 0.5 to 7.0%, and wherein the polyester film contains inert particles derived from catalysts and the amount of the inert particles determined by a dark-field microscopy satisfies the following conditions:

the number of inert particles having a particle size of from 1 to 10 μm is 200 to 20,000/mm$^2$; and the number of inert particles having a particle size of greater than 10 μm is 10/mm$^2$ or less.

The laminated film for optical use which is improved in uniformity, transparency, lubricity, color tone and scratch resistance, which deposits only a reduced amount of low molecular materials, and which is excellent in the adhesion to a layer adopted for various optical purposes.

14 Claims, No Drawings

LAMINATED FILM FOR OPTICAL USE

TECHNICAL FIELD

This invention relates to a laminated film for optical use. More particularly, the invention relates to a laminated film for optical use which is suitably used as a base material for reflection preventive films, touch screens, diffusion plates and so on for display devices such as LCDs, CRTs, PDPs and ELs.

BACKGROUND ART

A polyester film is excellent in strength, dimensional stability and chemical resistance and, therefore, the film is used for optical purposes. The polyester film is especially useful for display devices such as LCDs, CRTs, PDPs and ELs.

In the field of display devices, images have recently been displayed more and more precise and reproduced in color. Accordingly, there has arisen a strong demand for a laminated film for optical use having a uniform thickness, transparency, lubricity, and colorlessness of the color tone.

A polyester film by itself lacks lubricity and is difficult to be handled. Therefore, inorganic particles such as silica, calcium carbonate, kaolin etc., or organic particles such as silicone, cross-linked polystyrene, etc., are generally mixed, as lubricants, into the polyester film to form minute projections on the surface of the film to improve the lubricity.

To improve the lubricity by this method, however, it is necessary to be mixed with at least several hundreds ppm of inorganic or organic particles. Due to these particles light is scattered to cause degradation of the transparency of the polyester film. In addition, these particles help to decompose the polyester whereby the polyester film is likely colored yellow.

To maintain the transparency of the polyester film, there have been proposed to form a lubricity layer on the surface of the polyester film without mixing the inorganic or organic particles into the film, to balance the transparency and lubricity.

Even by this method, however, it is difficult to uniformly stretch the polyester film to produce a biaxially stretched polyester film and, thus, it was difficult to obtain a polyester film having a uniform thickness and orientation.

DISCLOSURE OF THE INVENTION

The present invention aims at solving the problems of the above prior arts.

The purpose of the invention is to provide a laminated film for optical use which is improved in the uniformity, lubricity, color tone and scratch resistance, which deposits only a reduced amount of low molecular materials, and which is excellent in the adhesion to the layer adopted for various optical applications.

According to the invention, the purpose is achieved by providing a laminated film for optical use comprising a polyester film which has a lubricity layer containing globular particles in at least one side thereof, wherein the laminate film has a thickness irregularity of 0.5 to 7.0%, and wherein the polyester film contains inert particles derived from catalysts and the amount of the inert particles determined by dark-field microscopy satisfies the following conditions:

the number of inert particles having a particle size of from 1 to 10 μm is 200 to 20,000/mm$^2$; and the number of inert particles having a particle size of greater than 10 μm is 10/mm$^2$ or less.

The invention is explained in detail.

<Polyester Film>

The polyester polymer, which constitutes the polyester film, may be an aromatic polyester, preferably polyethylene terephthalate, or polyethylene-2,6-naphthalene dicarboxylate. The aromatic polyester may be a homopolymer or a copolymer.

When a copolymer is adopted, there may be used, as the dicarboxylic acid component to be copolymerized, aliphatic dicarboxylic acids such as adipic acid and sebacic acid; aromatic dicarboxylic acids such as terephthalic acid, isophthalic acid, 2,6-naphthalene dicarboxylic acid; polyfunctional carboxylic acids such as trimellitic acid. As the diol component to be copolymerized, there may be used aliphatic glycols such as diethylene glycol, triethylene glycol, trimethylene glycol, tetramethylene glycol and neopentyl glycol, etc; cycloaliphatic glycols such as 1,4-cyclohexanedimethanol. The polyester film may contain anti-static agents and anti-oxidizing agents, for example.

The polyester film is preferably a biaxially oriented film to obtain a high mechanical strength.

<Inert Particles>

A polyester polymer is polymerized normally in the presence of metallic compounds used as catalysts. The metallic compounds remain in a form of inert particles in the polyester film. Accordingly, inert particles derived from catalysts are present in the polyester film.

For example, there are added, at the time of an ester exchange reaction, compounds of metals such as manganese, magnesium, calcium, lithium, sodium and potassium, or phosphorous compounds to the polymer material. Further, there are added, at the time of a polycondensation reaction of the polyester polymer, compounds of metals such as antimony, germanium and titanium. During the polycondensation reaction of the polyester polymer, these metallic compounds react with the dicarboxylic acid component or the diol component each of which is a constituting component of the polyester polymer, and form inert particles in which the metallic components bond solely or compositely to the organic components.

When the metallic components bond to the dicarboxylic acid component or to the diol component, which constitutes the polyester polymer, the resulting inert particles have a refractive index different from that of the polyester film.

The size and amount of the inert particles can be controlled by properly selecting the type, amount and the combination of the metallic compounds, and the temperature and reaction speed of synthesizing the polyester polymer.

The polyester polymer may contain, in addition to the inert particles, other minute, inorganic and inactive particles and organic inactive particles having an average particle size of 2 μm or less if their amount is extremely small, such as from 3 to 50 ppm. Examples of the inorganic inactive particles include silica, kaolin, alumina, calcium phosphate and those of organic inactive particles include globular cross-linking polyacryl, globular cross-linking polystyrene and globular silicone.

According to the laminated film of the invention, the laminated film recovered in the production stage can be re-used as the starting material. In this instance, the laminated film having a lubricity layer containing globular particles is melted and chipped to be used as the recovered polymer. The recovered polymer is mixed with a newly polycondensated virgin polymer. Thus, the resulted polyester film contains a small amount of the globular particles which are same as those contained in the lubricity layer. This embodiment also is included in the invention.

The amount of the inert particles derived from the catalysts contained in the polyester film can be determined by a dark-field microscopy, details of which are explained later in the column of Examples. In the determination, a very small amount of inorganic inactive particles and organic inactive particles may be seen simultaneously. However, these particles also are treated and measured as inert particles derived from catalysts because their amount is very small according to the invention.

With respect to the amount of the inert particles derived from the catalysts, the particles having a particle size of 1 to 10 μm are present in an amount of 200 to 20,000/mm², preferably 300 to 15,000/mm², and more preferably 500 to 10,000/mm². When the amount is less than 200/mm², the film is likely stretched ununiformly when it is biaxially stretched because of the shortage of the stress concentration preventive effect and of other reasons, causing uneven thickness, irregular orientation, etc. When the amount is more than 20,000/mm², the transparency of the film is degraded due to scattering of light by too many particles, resulting in the problem of blurring images when the resultant film is used for optical purposes.

The amount of the inert particles derived from the catalysts is controlled such that the number of particles having a particle size of over 10 μm is 10 particles/mm² or less. When there are more than 10 particles/mm², foreign matter defects appear on the image when the product is used as a laminated film for optical use.

The polyester film contains preferably no filler in view of transparency, according to the invention.

<Lubricity Layer>

The laminated film of the invention has a lubricity layer on at least one surface of the film. The lubricity layer has both the lubricity and adhesion properties.

The lubricity layer is preferably prepared by applying a mixed dispersion of the high molecular binder with the inert particles constituting the lubricity layer to a not-yet stretched sheet or monoaxially stretched film, and stretching and providing an inline coating process comprising a heat-treatment to the sheet or film.

The lubricity layer contains globular particles. The lubricity layer contains preferably both the globular particles and the high molecular binder, wherein the refractive index of the globular particles is preferred to be substantially same as that of the high molecular binder. The substantially same refractive index means that the difference in the refractive index between the globular particles and the high molecular binder is 0.02 or less, and preferably 0.1 or less.

<High Molecular Binder>

A high molecular binder is preferably water-soluble or water-dispersible, but a binder which is soluble in water containing a certain amount of an organic solvent can be also used. A polyester resin is a preferred high molecular binder in view of producing an excellent adhesion, according to the invention. The polyester resin may be employed alone, but it is preferably used as a mixture with an acrylic resin having oxazoline groups and polyalkylene oxide chains. The high molecular binder contained in the lubricity layer has a refractive index in the range preferably between 1.50 and 1.60.

<Polyester Resin>

Polyester obtained from the polybasic acid components and the diol components, selected from those shown below, can be used as the polyester resin constituting the high molecular binder. Examples of the polybasic components include terephthalic acid, isophthalic acid, phthalic acid, phthalic anhydride, 2,6-naphthalene dicarboxylic acid, 1,4-cyclohexane dicarboxylic acid, adipic acid, sebacic acid, trimellitic acid, pyromellitic acid, dimer acid and 5-sodium sulfoisophthalic acid. A preferred polyester resin constituting the high molecular binder is polyester copolymerized with two or more dicarboxylic acids. The polyester resin may contain unsaturated polybasic components such as maleic acid and itaconic acid; and hydroxylcarboxylic acid components such as p-hydroxy benzoic acid, if their amount is not too great.

Examples of the diol components for the polyester resin include ethylene glycol, 1,4-butanediol, diethylene glycol, dipropylene glycol, 1,6-hexanediol, 1,4-cyclohexane dimethanol, xylene glycol, dimethylol propane, poly(ethylene oxide)glycol, and poly(tetramethylene oxide) glycol.

The glass transition point of the polyester resin of the high molecular binder is preferably 40 to 100° C., and more preferably 60 to 80° C. The film obtained from the polyester resin of the above range shows excellent adhesion and scratch resistance. When the glass transition point is less than 40° C., a blocking action likely occurs between films, while when the point is over 100° C., the coating film is hardened to become brittle, degrading the scratch resistance, which is not preferable.

The intrinsic viscosity of the polyester resin of the high molecular binder is preferably 0.4 or more and less than 0.7, and more preferably 0.5 or more and less than 0.7. Within this range, the production of low molecular materials from the polyester resin can be suppressed. Further, excellent adhesion and scratch resistance can be obtained because the polyester resin has high cohesion strength. When the intrinsic viscosity is less than 0.4, low molecular materials are produced from the polyester resin, causing degrading the transparency of the base material, which is not preferable.

The polyester resin can be produced by the process shown below for example. The dicarboxylic acid component and the diol component are charged into an ester exchange reactor. A catalyst is added to the mixture and an ester exchange reaction is carried out in a nitrogen atmosphere at 230° C., while the produced methanol is distilled off. Then, the temperature is gradually raised to 255° C., and the pressure in the system is reduced for carrying out a polycondensation reaction to obtain a polyester resin. When the molecular weight increases during the polycondensation, so the melting viscosity is increased, causing difficulty in stirring the system. The polyester resin used for the lubricity layer has high melting viscosity even though it has a low molecular weight, in comparison with homo-polyethylene terephthalate and it is extremely difficult to stir the system. The intrinsic viscosity can be increased by raising the motor torque of the mixer, improving the shape of the impellers, extending the polymerizing time, etc.

The polyester-resin constituting the high molecular binder is contained in the lubricity layer in an amount of preferably 5 to 95 w/t %, more preferably 50 to 90 w/t %, and still more preferably 60 to 90 w/t %, based-on the weight of the lubricity layer. When the amount is less than 5 w/t %, the adhering power to the polyester film is reduced, resulting in insufficient adhesion to a hard coat and adhesive. When the amount of the polyester resin is greater than 95 w/t %, the cohesive power of the lubricity layer is reduced, causing an insufficient adhesion to the hard coat and adhesive, which is not preferable.

<Cross-Linker>

The lubricity layer preferably contains a cross-linker. The cross-linker is preferably mixed as a component for constituting the high molecular binder of the lubricity layer. Preferred examples of the cross-linker include epoxy, oxazoline, melamine and isocyanate. From among them, oxazoline is preferred from the point of ease of handling and the pot life of the coating solution. The most preferred embodiment of mixing the cross-linker includes using an acrylic resin as a high molecular binder, and using the cross-linker as the component for constituting the acrylic resin.

Examples of the cross-linger include poly-epoxy compounds, di-epoxy compounds, mono-epoxy compounds and glycidyl amine compounds. Examples of the poly-epoxy compounds include sorbitol, polyglycidylether, polyglycerol polyglycidylether, pentaerythritol polyglycidylether, diglycerol polyglycidylether, triglycidyltris (2-hydroxyethyl) isocyanate, glycerol polyglycidylether, and trimethylol propane polyglycidylether. Examples of the di-epoxy compounds include neopentylglycol glycidylether, 1,6-hexanediol diglycidylether, resorcindiglycidylether, ethylene glycol diglycidylether, polyethyleneglycol diglycidylether, propyleneglycol diglycidylether, polypropylene glycol diglycidylether, and polytetramethyleneglycol diglycidylether. Examples of monoepoxy compounds include allylglycidylether, 2-ethylhexylglycidylether and phenylglycidylether. Examples of glycidyl amine compounds include N,N,N',N'-tetraglycidyl-m-xylylenediamine, and 1,3-bis(N,N-diglycidylamino)cyclohexane.

As the cross-linker, oxazoline is most preferable. Particularly, it is preferred to use the oxazoline in a form of a polymer containing oxazoline groups. Such a polymer can be obtained by polymerizing solely an additive-polymerization type, oxazoline group containing monomer, or with other monomer.

Examples of the additive-polymerization type, oxazoline group containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These compounds may be used either singly or in a form of a mixture. Among them, 2-isopropenyl-2-oxazoline is easily available in trade and is suitably used.

As other monomers which are copolymerizable with the additive-polymerization type, oxazoline group-containing monomer can be used. Examples of the other monomers include (meth) acrylates such as alkyl acrylate, alkyl methacrylate (the alkyl group may be, for example, methyl, ethyl, n-propyl, isopropyl, n-butyl, isobutyl, t-butyl, 2-ethylhexyl or cyclohexyl); unsaturated carboxylic acids such as acrylic acid, methacrylic acid, itaconic acid, maleic acid, fumaric acid, crotonic acid styrene sulfonic acid and their salts (for example, sodium salt, potassium salt, ammonium salt and tertiary amine salt); unsaturated nitriles such as acrylonitrile and methacrylonitrile; unsaturated amides such as acrylamide, methacrylamide, N-alkylacrylamide, N-alkylmethacrylamide, N,N-dialkylacrylamide, and N,N-dialkylmethacrylate(the alkyl group may be, for example, methyl, ethyl, n-propyl, isopropyl, n-butyl, isobutyl, t-butyl, 2-ethylhexyl or cyclohexyl); vinyl ethers in which polyalkylene oxide is added to the ester part of vinyl acetate, vinyl propionate, acrylic acid or methacrylic acid; α-olefin such as ethylene and propylene; halogen-containing α, β-unsaturated polymers such as vinyl chloride, vinylidene chloride and vinyl fluoride; and α, β-unsaturated aromatic monomers such as styrene and α-methylstyrene. These monomers may be used either singly or in a form of a mixture.

As the melamine cross-linker, preferred are ether compounds obtained by reacting lower alcohols such as methyl alcohol, ethyl alcohol or isopropyl alcohol with methylol melamine derivates which, in turn, are obtained by condensing melamine with formaldehyde, or mixture of the ether compounds.

Examples of the methylol melamine derivative include monomethylol melamine, dimethylolmelamine, trimethylol melamine, tetramethylol melamine, pentamethylol melamine and hexamethylol melamine.

Examples of the isocyanate cross-linker include tolylene diisocyanate, diphenylmethane-4,4'-diisocyaante, meta-xylylene diisocyanate, hexamethylene-1,6-diisocyanate, 1,6-diisocyanate hexane, an adduct of tolylene diisocyanate with hexane diol, polyol modified diphenylmethane-4,4'-diisocyante, carbodiimide modified diphenylmethane-4,4'-diisocyante, isophorone diisocyanate,1,5-naphthalene diisocyanate, 3,3'-bitolylene-4,4'-diisocyanate, 3,3'-dimethyldiphenylmethane-4,4'-diisocyante, and metaphenylene diisocyanate.

The cross-linker may be contained in an amount of preferably 0.1 to 30 w/t %, and more preferably 10 to 25 w/t %, based on 100 w/t % of the composition of the lubricity layer. When the amount is less than 0.1 w/t %, the cohesive force of the coating film may not be exhibited, causing shortage of the adhesion, which is not preferable. When the amount is over 30 w/t %, the coating film may become extremely hardened, resulting in that the stress relief is reduced and no sufficient adhesion is exhibited, or foreign matters derived from cross-linkers may be produced when coated films are recovered to be re-used, which are not preferable.

<Acrylic Resin>

In the case where oxazoline is adopted as the cross-liker, it is most preferable to use an acrylic resin which has oxazoline groups and polyalkylene oxide chains. As the acrylic resin, there may be listed the acrylic resin which uses the following monomer having the oxazoline groups and the monomer having the polyalkylene oxide chains.

Examples of the monomer having the oxazoline groups include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These compounds may be used either singly or in a form of a mixture. Among them, 2-isopropenyl-2-oxazoline is easily available in trade and is suitably used. By using the acrylic resin having oxazoline groups, the cohesive strength of the lubricity layer is improved whereby the adhesion to a hard coat, adhesive layer, etc., is strengthened. Further, the use of the acrylic resin having oxazoline groups gives frictional resistance to metallic rollers used in the film-producing step, and in the hard coat processing step.

Examples of the monomer having polyalkylene oxide chains may be those in which polyalkylene oxide is added to the ester part of an acrylic acid or methacrylic acid. Examples of the polyalkylene oxide chains include polymethylene oxide, polyethylene oxide, polypropylene oxide and polybutylene oxide. The number of repeating units of the polyalkylene oxide chain is preferably 3 to 100. By using the acrylic resin which has polyalkylene oxide chains, the compatibility between the polyester resin and the acrylic resin of the high molecular binder in the lubricity layer is improved in comparison with the case where an acrylic resin containing no polyalkylene oxide chain is used and, accordingly, the transparency of the lubricity layer can be improved. When the number of repeating units of the polyalkylene oxide chain is less than 3, the compatibility between the polyester resin and the acrylic resin is reduced, causing degradation in the transparency of the lubricity layer, while when number of the repeating units is greater than 100, the resistance to moisture and to heat of the lubricity layer is reduced, resulting in decreasing the adhesion to the hard coat, etc., in a high moisture and high temperature conditions.

Other monomers, shown below; may be copolymerized with the acrylic resin. Examples of the copolymerizable monomers include alkylacrylate and alkylmethacrylate (the alkyl group maybe, for example, methyl, ethyl, n-propyl, isopropyl, n-butyl, isobutyl, t-butyl, 2-ethylhexyl or cyclohexyl); hydroxyl-containing monomers such as 2-hydroxyethyl acrylate, 2-hydroxyethyl methacrylate, 2-hydroxypropylacrylate and 2-hydropropylmethacrylate; epoxy group-containing monomers such as glycidyl acrylate, glycidyl methacrylate, and allylglycidyl ether; monomers containing carboxyl groups and their salts such as acrylic acid, methacrylic acid, itaconic acid, maleic acid, fumaric acid, crotonic acid, styrene sulfonic acid and their salts (sodium salts, potassium salts, ammonium salts, tertiary amine salts, etc.); monomers having amide groups such as acrylamide, methacrylamide, N-alkylacryl amide, N-alkylmethacryl amide, N,N-dialkylacrylamide, N,N-dialkylmethacrylate (the alkyl group may be, for example, methyl, ethyl, n-propyl, isopropyl, n-butyl, isobutyl, t-butyl, 2-ethylhexyl or cyclohexyl), N-alkoxyacryl amide, N-alkoxymethacryl amide, N,N-dialkoxyacryl amide, N,N-dialkoxymethacryl amide (the alkoxy group may be methoxy, ethoxy, butoxy, isobutoky, etc.), acryloyl morpholine, N-methylol acrylamide, N-methylol methacrylamide, N-phenyl acrylamide and N-phenyl methacrylamide; monomers of acid anhydrides such as maleic anhydride and itaconic anhydride; vinyl isocyanate, allylisocyanate, styrene, α-methyl styrene, vinylmethyl ether, vinylethyl ether, vinyltrialkoxy silane, alkylmaleic acid monoester, alkyl fumaric acid monoester, alkyl itaconic acid monoester, acrylonitrile, methacrylonitrile, vinylidene chloride, ethylene, propylene, vinyl chloride, vinyl acetate and butadiene.

The acrylic resin which has oxazoline groups and polyalkylene oxide chains, of the high molecular binder, is contained in the lubricity layer in an amount of preferably 5 to 95 w/t %, more preferably 5 to 90 w/t %, and still more preferably 10 to 50 w/t %. When the amount of the acrylic resin having oxazoline groups and polyalkylene oxide chains is less than 5 w/t %, the cohesive power of the lubricity layer is decreased, causing insufficient adhesion to the hard coat, adhesive, etc. When the amount is greater than 95 w/t %, the adherence to the polyester film is reduced, resulting in insufficient adhesion to the hard coat, to the adhesive, etc., which is not preferable.

<Globular Particles>

Examples of the globular particles constituting the lubricity layer according to the invention include inorganic inert particles of calcium carbonate, magnesium carbonate, calcium oxide, zinc oxide, magnesium oxide, silicon oxide, silicate of soda, aluminum hydroxide, iron oxide, zirconium oxide, barium sulfate, titanium oxide, tin oxide, antimony trioxide, carbon black, molybdenum disulfide, etc.; and organic inert particles of acrylic cross-linking polymer, styrene-type cross-linking polymer, silicone resin, fluorine resin, benzoguanamine resin, phenolic resin, nylon resin, etc. These inorganic or organic particles may be used either singly or in a form of a mixture of two or more kinds.

Preferred globular particles constituting the lubricity layer of the invention are composite inorganic particles of silica and titania. The composite inorganic particles are suitable because the refractive index can be optionally and easily controlled. As the refractive index of the high molecular binder is in the range between 1.50 and 1.60, the index of the globular particles can be easily adjusted to that of the high molecular binder.

According to the invention, the difference in the refractive index of the high molecular binder and that of the globular particles is preferably within 0.02, and more preferably within 0.01. When the difference is over 0.02, light scatters greatly due to the difference in the refractive indexes at the border between the high molecular and the globular particles, resulting in increasing haze to degrade the transparency. Both the refractive index of the high molecular binder and that of the globular particles are preferably in the range between 1.50 and 1.60.

The average particle size of the globular particles is preferably 20 to 200 nm, and more preferably 40 to 120 nm. When the particle size is less than 20 nm, no sufficient lubricity and scratch resistance are obtained. When the average particle size is greater than 200 nm, particles are likely dropped off, which is not preferable.

The globular particles are contained preferably in an amount of 0.1 to 10 w/t % of the lubricity layer. When the amount is less than 0.1 w/t %, no sufficient lubricity and scratch resistance are obtained. When the amount is greater than 10 w/t %, the cohesive force of the coating film is decreased, resulting in degrading adhesion, which is not preferable.

<Aliphatic Wax>

The lubricity layer preferably contains aliphatic wax. The aliphatic wax is contained preferably in an amount of 0.5 to 30 w/t %, and more preferably 1 to 10 w/t %, based on the total weight of the lubricity layer. When the wax is contained in an amount of less than 0.5 w/t %, the film surface may be in short of lubricity, which is not preferable. When the wax is contained in an amount of greater than 30 w/t %, there may be short of, the adhesion to the polyester film base and, the easy adherence to a hard coat, adhesive, etc. Concrete examples of the aliphatic wax include plant waxes such as carnauba wax, candelilla wax, rice wax, Japanese wax, jojoba oil, palm wax, rosin modified wax, ouricury wax, sugarcane wax, Esparto wax and bark wax; animal waxes such as bees wax, lanoline, whale wax, Ibotaro, and shellac wax; mineral waxes such as montan wax, ozokerite and ceresine wax; petroleum waxes such as paraffin wax, microcrystalline wax and petrolatum wax; and synthetic hydrocarbon waxes such as Fischer-Tropsch wax, polyethylene wax, polyethylene oxide wax, polypropylene wax and polypropylene oxide wax. From among these waxes, carnauba wax, paraffin wax and polyethylene wax are particularly preferred in view of the easy adherence to a hard coat, adhesive, etc. and of the excellent lubricity. These waxes are used preferably in a form of an aqueous dispersion for the decrease of burdens on the environment and for the ease of handling.

Additives>

The lubricity layer may contain other inert particles to the extent not to affect the transparency, to improve the lubricity and scratch resistance. Examples of the other inert particles include inorganic inert particles of calcium carbonate, magnesium carbonate, calcium oxide, zinc oxide, magnesium oxide, silicon oxide, silicate of soda, aluminum hydroxide, iron oxide, zirconium oxide, barium sulfate, titanium oxide, tin oxide, antimony trioxide, carbon black, molybdenum disulfide, etc.; and organic inert particles of acrylic cross-linking polymer, styrene-type cross-linking polymer, silicone resin, fluorine resin, benzoguanamine resin, phenolic resin, nylon resin, etc. Among them, water-insoluble solids are preferably inert particles having a specific gravity of less than 3, to be prevented from setting out in an aqueous dispersion.

<Dyes and Pigments>

The laminated film of the invention may contain dyes and pigments for adjusting the color tone. The dyes and pigments may be contained in either the polyester film used as the basic material or the lubricity layer, or both. Blue-, green- or red-base dyes and pigments may be used. To correct a tinge of yellow of the film, blue-base dyes or pigments can be effectively used.

Preferred blue-base dyes or pigments include anthraquinone-base blue dyes such as Color Index Solvent Blue 45, and phthalocyanine-base blue pigments having a peak absorption at around 600 to 700 nm. The Color Index Solvent Blue 45 is particularly preferred from the point of heat resistance and solubility in polyester.

When dyes or pigments are contained, they may be controlled such that the color b*value determined by measuring the permeated light through the laminated polyester film is in the range between −0.5 and 1.5.

For example, a blue dye is added to the polyester film preferably in an amount of 0.2 to 5 ppm. When the dye is contained in the lubricity layer, it is preferably added in an amount of 200 to 5,000 ppm in view of the thickness of the layer.

<Characteristic Features of the Laminated Film>

The laminated film of the invention has a thickness of preferably 25 to 300 μm, more preferably 50 to 250 μm, and still more preferably 100 to 250 μm, to have a sufficient strength for supports for liquid crystals, hard coats, touch panels, anti-dazzle treatment goods, electromagnetic wave shield film for PDF(plasma display panels), organic ELs (organic electroluminescence displays), etc.

The thickness irregularity of the film of the invention is 0.5 to 7.0%, preferably 0.7 to 5.0%, more preferably 1.0 to 4.0%. When the irregularity in thickness is less than 0.5%, the film should be produced at an extremely low speed even if it contains inert particles satisfying the above conditions. This causes decrease in productivity and difficulty in commercial production. When the irregularity is greater than 7.0%, problems such as distortion of images, color unevenness and so on, may be resulted due to the insufficient uniformity in film thickness, when the films are used as base materials for reflection preventive films, touch screens, diffusion plates, etc.

The haze value of the laminated film of the present invention is preferably 0.3 to 1.5%. When the value is greater than 1.5%, the sharpness of the images in display devices, etc., is reduced, which is not preferable.

The average surface roughness (Ra) at the center line of the lubricity layer surface of the laminated film according to the invention is preferably 0.002 to 0.01 μm, and the frictional coefficient (μs) of the lubricity layer surface is preferably 0.8 or less. When the lubricity layer surface has the value in the above range, an excellent lubricity is obtained.

The color b*value determined by measuring the permeated light through the laminated film according to the invention is preferably in the range between −0.5 and 1.5. When the value is less than −0.5, the blue color in images appearing in display devices, etc., tends to be too strong, while when the value is over 15, images tend to become yellow tone, both of which are not preferable.

Laminated films satisfying these requirements can be obtained by forming lubricity layers composed of the mentioned composition.

<Production Process>

The composition for forming the lubricity layer (referred to sometimes as coating film) is preferably used in a form of an aqueous coating liquid, such as an aqueous solution, aqueous dispersion or emulsified solution. For forming the coating film, resins other than the above composition may be used when necessary, examples of which include anti-static agents, coloring agents, surfactants, ultraviolet ray absorber, cross-linkers, etc.

The concentration of solids in the aqueous coating liquid is normally 20 w/t % or less, and preferably 1 to 10 w/t %. When the concentration is less than 1 w/t %, the coating liquid may be short of wetting properties to be applied to the polyester film. When the concentration is greater than 20 w/t %, the stability of the coating liquid or the appearance of the lubricity layer may be degraded, which is not preferable.

The polyester film can be produced, for example, by the following process.

Polyester, for example, is melted and extruded in a film-like form. The extruded polyester is cooled to be solidified in a casting drum to form a not-yet-stretched film. The not-yet-stretched film is stretched to a longitudinal direction at a temperature of Tg~(Tg+60)° C. once, twice or more times so that the film may be enlarged by 3- to 6-fold magnification. Subsequently, the film is stretched to a cross direction at Tg~(Tg+60)° C. so that the film may be enlarged by 3- to 5-fold magnification. When necessary, the film is provided with a further thermal treatment at 180 to 230° C. for 1 to 60 seconds, followed by a second thermal treatment at a temperature lower than that of the thermal treatment by 10 to 20° C., to be stretched to a cross direction with being contracted by 0 to 20%. The glass transition temperature is abbreviated as Tg.

The aqueous coating liquid may be applied to the polyester film at an optional stage after the not-yet-stretched film is obtained. Preferably, the liquid is applied during the production process of the polyester film, and more preferably it is applied to the polyester film prior to the time an oriented crystallization is completed.

The polyester film prior to the completion of the oriented crystallization include a not-yet-stretched film, a monoaxially oriented film wherein the not-et-stretched film is oriented either to lengthwise or crosswise direction, and a film stretched biaxially to both the lengthwise direction and the crosswise direction at a small extent (a biaxially stretched film prior to the completion of the oriented crystallization by finally re-stretching the film to lengthwise or crosswise direction). Particularly it is preferred to coat the aqueous coating liquid of the above composition onto the not-yet-stretched film or a mono-axially stretched film, to stretch the coated film lengthwise and/or crosswise and to heat-fix the stretched film.

When the aqueous coating liquid is coated to the film, the film surface is preferably provided with a physical treatment, such as a corona surface treatment, a flame treatment and a plasma treatment, as a preparatory treatment to improve the coating result. Alternately, a surfactant which is chemically inactive with the composition is preferably used together with the composition. The surfactant contributes to accelerate the wetting of the aqueous coating liquid to be applied to the polyester film and to stabilize the coating liquid. Examples of the surfactant include anionic or nonionic surfactants of polyoxyethylene-aliphatic acid ester, sorbitan aliphatic acid ester, glycerine aliphatic acid ester, aliphatic acid metallic soap, alkyl sulfate, alkyl sulfonate, and alkyl sulfosuccinate. The surfactant is preferably contained in an amount of 1 to 10 w/t % in the composition forming the coating film.

The amount of the coating liquid is preferably controlled such that the thickness of the coating film is in the range between 0.01 and 0.3 μm, and preferably between 0.02 and 0.25 μm. When the coating film is too thin, it lacks adhesive power, while when it is too thick, a blocking or an increase in the haze value occurs.

The coating liquid can be applied by a known method, such as a roll coating, gravure coating, roll brushing, spray coating, air knife coating, impregnation, curtain coating, etc. These methods can be adopted either singly or in a form of a combination. The coating film can be formed on one side surface only or on both sides of the film.

EXAMPLES

The invention is explained with reference to examples.

In the following examples and comparative examples, all parts are based on weight unless otherwise defined. The evaluation and determination are carried out by the following methods.

(1) Determination of Particles in the Film by a Dark-Field Micrography

The surface of the laminated film was treated with methylethyl ketone to remove a lubricity layer, and was taken photographs with a microscope (Nikon Microphoto-FX) by a transmission dark-field determination method with 10 calibrations and 100-fold magnification. From the obtained photographs, the number of particles having a particle size of 1 to 10 μm was counted by an image analyzing device. When particles have no spherical form, the average value of the short diameter and the long diameter of one particle was treated as the particle size.

(2) Thickness Irregularity of the Laminated Film

The thicknesses of the film to the widthwise direction and to the lengthwise direction were determined under the following conditions, by an electronic micrometer (produced by ANRITSU, Model KG601B). The thickness r was obtained by dividing the difference between their maximum value and the minimum value by the film thickness.

Sample area: lengthwise direction 2 m
widthwise direction 3 m

Measuring intervals: 30 cm intervals to the lengthwise direction

Measuring speed: 5 mm/sec.

(3) Haze Value

The haze value of the film was measured by a haze measuring device (produced by Nippon Denshoku Kogyo, Model NDH-2000), in accordance with the procedure described in JIS K7136. The haze value of films was evaluated by the following standard:

◎): haze value≦1.0% . . . extremely good film haze
○: 1.0%<haze value≦1.5% . . . good film haze
X 1.5%<haze value . . . bad film haze.

(4) Color b*Value Determined by Measuring the Permeated Light Through the Laminated Film The color b*value of the laminated film was determined by measuring the permeated light, using a color meter (produced by Nippon Denshoku Kogyo; Model SZ-Σ90), in accordance with the procedure described in JI-Z8722 and 8729.

(5) Scratch Resistance

A hard chrome-plated pin having 6 mm diameter was fixed. Films, which were cut at 20 cm lengthwise and at 15 mm crosswise, were contacted with the pin by an angle of 90° and were slid on the pin at a predetermined speed of 20 mm/sec, and the scratchs on the surfaces of the films were evaluated by the criteria below:

5: no scratch
4: 0%<scratched area based on the total area≦10%
3: 10%<scratched area based on the total area≦25%
2: 25%<scratched area based on the total area≦50%
1: 50%<scratched area based on the total area (6) Average Surface Roughness (Ra) at the Center Line The average surface roughness was determined by a high precision surface roughness tester produced by Kosaka Kenkyu-sho, model SE-3FAT, in accordance with JIS B0601. A chart was drawn by a radius 2 μm needle with a 30 mg load, at 200,000-fold magnification and a cut-off of 0.08 mm. From the surface roughness curve, the part of length L measured toward the center line was taken out, and the center line of the taken out part was set as the X-axis and the axial magnification direction as the Y-axis. When the roughness curve is represented by Y=f (x), the value given by the following formula was shown by an nm unit. Four measurements were made with taking 1.25 mm as a reference length and the average value of the four measurements was shown.

$$Ra = (1/L)\int_0^L |f(x)|\,dx$$

(7) Frictional Coefficient (μs)

A static frictional coefficient (μs) between the coating film forming surface and the polyethylene terephthalate film (surface having no coating film) was measured by a slippery measuring device (produced by Toyo Tester Sha), in accordance with the procedure described in ASTM D1894-63. The sled plate used is a glass plate and a 1 kg load was used. The lubricity of the film was evaluated by the following criteria:

◎: frictional coefficient (μs)≦0.5 . . . extremely good lubricity
○: 0.5<frictional coefficient (μs)≦0.8 . . . good lubricity
X: 0.8<frictional coefficient (μs) . . . bad lubricity (8) Adhesion Hard Coat A hard coat layer of 10 μm thickness, formed on the surface of the polyester to which a coating surface is formed, was cross cut to form 100 pieces of 1 mm² grids. A 24 mm wide cellophane tape (produced by Nichiban Sha) was pasted onto the cross cuts and was rapidly peeled off with a peeling angle of 180°. The surface from which the tape was peeled off was observed and was evaluated in accordance with the following criteria.

5: peeled off area is 10% or less . . . extremely good adhesion
4: peeledoff area is 10% ormore and 20% or less . . . good adhesion
3: peeled off area is 20% or more and 20% or less . . . relatively good adhesion
2: peeled off area is 30% or more and 40% or less . . . insufficient adhesion
1: peeled off area is 40% or more . . . extremely insufficient adhesion Adhesive (PSA)

20 μm thick adhesive (PSA: Pressure Sensitive Adhesive) layer was formed on the laminate film surface on which a coating film is to be applied. The adhesive layer surface was pasted to a float glass and was retained for one day under 65% RH atmosphere. Subsequently the adhesive layer was peeled off from the glass surface with a peeling angle of 90°, and the residual state of the adhesive on the glass was observed and evaluated on the basis of the following criteria.

The adhesive (PSA) used comprises a urethane-containing acrylate copolymer wherein the acrylic component comprises n-butylacrylate (86 mol %) and methacrylate (14 mol %).

5: residual adhesive area is less than 10% . . . extremely good adhesion
4: residual adhesive area is 10% or more and less than 20% . . . good adhesion
3: residual adhesive area is 20% or more and less than 30% . . . r elatively good adhesion
2: residual adhesive area is 30% or more and less than 40% . . . insufficient adhesion
1: residual adhesive area is 40% or more . . . extremely insufficient adhesion (9) Blocking Resistance Two films were overlapped with each other such that the coating film forming surfaces were contacted to each other, were pressed with a pressing force of 0.6 kg/cm$^2$, for 17 hours at 60° C. under 80% RH, and were peeled off. The blocking resistance was evaluated by the peeling force applied in accordance with the following criteria:

⊚: peeling force<98 mN/5 cm . . . extremely good blocking resistance
○: 98 mN/5 cm≦peeling force<147 mN/5 cm . . . good blocking resistance
Δ: 147 mN/5 cm≦peeling force<196 mN/5 cm . . . relatively good blocking resistance
X: 196 mN/5 cm≦peeling force . . . bad blocking resistance

(10) Glass Transition Temperature

About 10 mg of sample was sealed in an aluminum pan and was connected to a differential scanning calorimeter (produced by Du Pont; Model: V4.OB2000 Type DSC). The sample was heated from 25° C. to 300° C. at a speed of 20° C./min, was maintained 5 minutes at 300° C., and was taken out to be transferred on ice to be rapidly cooled. The pan was again connected to the differential scanning calorimeter and was heated from 25° C. at a speed of 20° C./min. to determine the glass transition temperature (Tg: ° C.).

(11) Intrinsic Viscosity

The intrinsic viscosity η (dl/g) was determined with an o-chlorophenol solution at 25° C.

(12) Thickness of the Coating Layer

Films fixed in an embedding resin were cut at their cross-sections by a microtone, and were dyed in a 2% osmium acid at 60° C. for two hours. Then, the thickness of the coating layer was determined by a transmission electron microscope (produced by Nippon Denshi, Model JEM2010).

(13) Refractive Index

High Molecular Binder

The coating materials were dried to solid in a plate state at 90° C. and its refractive index was measured by an Abbe refractive meter (D line: 589 nm).

Inert Particles

Inert particles, dried to solid at a temperature of 90° C., were suspended in a number of liquids each having a refractive index different from each other, and the refractive index of the liquid in which the suspension is seen most transparent was measured by an Abbe refractive meter (D line: 589 nm).

(14) Heat Resistance

Films were heat-treated at 120° C. for 60 minutes and the variation of each of their haze values was measured. The variation was evaluated based on the following criteria:

⊚: haze value variation≦1.0% . . . the film has an extremely good heat resistance
○: 1.0%<haze value variation≦2.5% . . . good heat resistance
X: 2.5%<haze value variation . . . insufficient heat resistance
Variation of the haze value=haze value of the heat-treated film−(minus) haze value of not-yet heat-treated film

(15) General Evaluation

An evaluation was made by the following criteria:

⊚: The scratch resistance is 5; the surface roughness (Ra) is in the range between 0.002 and 0.01 μm; the adhesion to both the hard coat and the adhesive is 3 or more; and the evaluations on the haze, frictional coefficient and blocking resistance are all ⊚. (General evaluation: extremely good)

○: The scratch resistance is 4 or greater; the surface roughness (Ra) is in the range between 0.002 and 0.01 μm; the adhesion to both the hard coat and the adhesive is 3 or more; and the evaluation on any of the haze, frictional coefficient and blocking resistance is ○ and there is neither evaluation of Δ nor X. (General evaluation:good)

Δ: The scratch resistance is 3 or greater; the surface roughness (Ra) is in the range between 0.002 and 0.01 μm; the adhesion to both the hard coat and the adhesive is 3 or more; and the evaluation on any of the haze, frictional coefficient and blocking resistance is Δ, and there is no evaluation of X.

(General Evaluation: Relatively Good)

X: There applies at least one item from that the scratch resistance 2 or less; the surface roughness (Ra) is outside the range between 0.002 and 0.01 μm; the adhesion to the hard coat or the adhesive is 2 or less; and the evaluation on any of the haze, frictional coefficient and blocking resistance is X. (General evaluation: bad)

Example 1

There were prepared polyester for a polyester film, and a coating liquid comprising a polyester resin, an acrylic resin, globular particles and wetting agents.

Polyester for the Polyester Film:

100 parts of dimethyl terephthalate, 65 parts of ethylene glycol and 0.04 parts of manganese acetate tetrahydrate were charged into a reactor. The mixture was heated to 240° C. in three hours to carry out an ester exchange reaction. Then, 0.02 parts of orthophosphoric acid and 0.02 parts of antimony trioxide were added, followed by raising the temperature to 290° C. in three hours under a reduced pressure (~2 mmHg) to carry out a polycondensation reaction, resulting in pellets of polyethylene terephthalate having an intrinsic viscosity of 0.65 dl/g.

Coating Liquid:

65 w/t % of the polyester resin shown below, 20 w/t % of an acrylic resin, 10 w/t % of globular particles and 5 w/t % of a wetting agent were mixed and dispersed to prepare an aqueous coating liquid having a concentration of 8 w/t % of these materials.

Polyester Resin:

A polyester resin comprising, as acid components, 70 mol % of 2,6-naphthalene dicarboxylic acid/25 mol % of isophthalic acid/5 mol % of 5-sodiumsulphoisophthalic acid and, as glycol components, 90 mol % of ethylene glycol/10 mol % of diethylene glycol.

Acrylic Resin:

An acrylic resin comprising 25 mol % of methylmethacrylate/30 mol % of 2-isopropenyl-2-oxazoline/10 mol % of polyethyleneoxide methacrylate/35 mol % of acrylamide. The acrylic resin contains 30 mol % of 2-isopropenyl-2-oxazoline as a cross-linker, in the polymer.

Globular Particles:

Globular cross-linking acrylic particles having an average particle size of 100 nm.

Wetting Agent:

Polyoxyethylenelauryl ether.

The pellets of polyethylene terephthalate polymer were dried under a reduced pressure for six hours at 140° C. and were supplied to an extruder. In the extruder, the polyester resin was melted and extruded into a rotary cooling drum, in a form of a sheet by an electrostatic applying method, air knife method, etc., to obtain a not-yet stretched sheet having little thickness irregularity. Subsequently, the obtained sheet was heated to 100° C. and was stretched to the lengthwise direction (longitudinal direction) by 3.5-fold to obtain a monoaxially oriented film. Then, the coating liquid was coated to both surfaces of the monoaxially oriented film by a reverse roller method. The film was further stretched to a crosswise direction (widthwise direction) by 3.8-fold in a zone heated to 140° C., followed by a heat treatment in a heat treatment zone of 220° C., to obtain a biaxially oriented laminated film for optical use having a thickness of 125 μm. Each of the lubricity layers formed on both surfaces of the film has a thickness of 80 nm. Evaluation results are shown in Table 1.

TABLE 1

|  | Particles/mm² | | Film thickness irregularity (%) | Haze (%) | Color B* |
| --- | --- | --- | --- | --- | --- |
|  | Size 1~10 μm | Size over 10 μm |  |  |  |
| Ex. 1 | 6,000 | 3 | 3.5 | 0.6 | 0.5 |
| Ex. 2 | 17,000 | 7 | 0.8 | 0.6 | 0.7 |
| Ex. 3 | 400 | 1 | 6.5 | 0.5 | 0.8 |
| Ex. 4 | 8,600 | 5 | 4.5 | 1.0 | 1.0 |
| Ex. 5 | 6,200 | 4 | 3.3 | 0.5 | 0.4 |
| Ex. 6 | 5,800 | 3 | 3.6 | 0.6 | −0.3 |
| Ex. 7 | 6,100 | 4 | 3.4 | 0.6 | −0.4 |
| Comp. Ex. 1 | 22,000 | 9 | 0.5 | 0.1 | 1.6 |
| Comp. Ex. 2 | 100 | 2 | 7.5 | 0.4 | 0.5 |
| Comp. Ex. 3 | 6,100 | 5 | 3.1 | 1.6 | 1.3 |
| Comp. Ex. 4 | 45,000 | 20 | 1.1 | 2.6 | 1.8 |

Ex. = Example
Comp. Ex. = Comparative Example

Example 2

Procedures of Example 1 were repeated except that magnesium acetate tetrahydrate was used in place of manganese acetate tetrahydrate, to obtain a laminated film for optical use. Evaluation results are shown in Table 1.

Example 3

Procedures of Example 1 were repeated except that 0.005 parts of tetrabutoxy titanium was used in place of antimony trioxide, to obtain a laminated film for optical use. Evaluation results are shown in Table 1.

Example 4

Procedures of Example 1 were repeated except that the amount of the melted polyester polymer was changed to obtain a film thickness of 175 μm and whereby a laminated film for optical use was obtained. Evaluation results of the film are shown in Table 1.

Example 5

Procedures of Example 1 were repeated except that globular silica having an average particle size of 80 nm was used in the coating liquid in place of globular cross-linking acrylic particles, to obtain a laminated film for optical use. Evaluation results of the film are shown in Table 1.

Example 6

Procedures of Example 1 were repeated except that 0.0001 parts of Terazole Blue RLS, as a blue dye, was added following the addition of antimony trioxide, and a laminated film for optical use was obtained. Evaluation results of the film are shown in Table 1.

Example 7

Procedures of Example 1 were repeated except that 0.1 parts of Terazole Blue RLS, as a blue dye, was added to the coating liquid, and a laminated film for optical use was obtained. Evaluation results of the film are shown in Table 1.

Comparative Example 1

Procedures of Example 1 were repeated except that the amount of antimony oxide was 0.10 parts and that trimethyl phosphate was used in place of the orthophosphoric acid, and a laminated film for optical use was obtained. Evaluation results of the film are shown in Table 1.

Comparative Example 2

Procedures of Example 1 were repeated except that the amount of the antimony trioxide was 0.01 parts and that the amount of the orthophosphoric acid was 0.06 parts, whereby a laminated film for optical use was obtained. Evaluation results of the film are shown in Table 1.

Comparative Example 3

Procedures of Example 1 were repeated except that amorphous silica having an average particle size of 130 nm was used in place of globular, cross-linking acrylic particles contained in the coating liquid, and a laminated film for optical use was obtained. Evaluation results of the film are shown in Table 1.

Comparative Example 4

Procedures of Example 1 were repeated except that the polyester for the polyester film was synthesized with an addition of 0.05 parts of calcium carbonate having an average particle size of 0.6 μm, and a laminated film for optical use was obtained. Evaluation results of the film are shown in Table 1.

The qualities of the films are shown in Table 1 for the Examples 1 to 7 and Comparative Examples 1 to 4. Films of the Examples are all excellent in thickness irregularity, haze and color tone, as shown in Table 1.

Examples 8 to 10 and Comparative Examples 5 and 6

Melted polyethylene terephthalate ([η]=0.62 dl/g, Tg=78° C.) was extruded from a die and was cooled in a cooling drum by a conventional process to form a not-yet stretched film, followed by stretching the film to the longitudinal direction by 3.2-fold. Then, an aqueous coating liquid, shown in Table 3, containing a coating material in a concentration of 8% was coated by a roll coater to both surfaces of the resulted film (each of coating liquids A1 to A6 contains the composition shown in Table 2 and a high molecular binder of which refractive index shown in Table 3).

The coated film was dried at 95° C., stretched by 3.5-fold to a crosswise direction at 125° C., contracted by 3% to the width direction and heat-fixed whereby a laminated film for optical use having a thickness of 125 μm was obtained. The thickness of the coating film is 0.1 μm. Evaluation results of the film are shown in Table 4.

Components composing the coating liquids A1 to A5 above were prepared as follows:

Polyester Resin A1:

The polyester resin A1 comprises, as acid components, 63 mol % of 2,6-naphthalene dicarboxylic acid/32 mol % of isophthalic acid/5 mol % of 5-sodium sulfoisophthalic acid and, as glycol components, 90 mol % of ethylene glycol/10 mol % of diethylene glycol, with Tg of 76° C. and an average molecular weight of 12,000. The polyester A1 was prepared, in accordance with the procedure shown in Example 1 of Kokai (Jpn. Unexamined Patent Publication) 06-116487, as follows:

42 parts of dimethyl 2,6-sodium dicarboxylate, 17 parts of dimethyl isophthalate, 4 parts of dimethyl 5-sodium sulfoisophthalate, 33 parts of ethylene glycol and 2 parts of diethylene glycol were charged into a reactor, followed by an addition of 0.05 parts of tetrabutoxy titanium. The mixture was heated to a temperature controlled to 230° C. under a nitrogen atmosphere, to carry out an ester exchange reaction while distilling off the produced methanol. Then, the reaction system was gradually heated to 255° C. to carry out a polycondensation reaction under a reduced pressure of 1 mmHg, whereby polyester A1 was obtained.

Polyester Resin A2:

The polyester resin A2 comprises, as acid components, 95 mol % of terephthalic acid/5 mol % of 5-sodium sulfoisophthalic acid and, as glycol components, 90 mol % of ethylene glycol/10 mol % of diethylene glycol, with Tg of 72° C. and an average molecular weight of 13,000. The polyester A2 was prepared, in accordance with the procedure shown in Example 1 of Kokai (Jpn. Unexamined Patent Publication) 06-116487, as follows:

56 parts of dimethyl terephthalate, 5 parts of 5-sodium sulfoisophthalic acid, 36 parts of ethylene glycol and 3 parts of diethylene glycol were charged into a reactor, followed by an addition of 0.05 parts of tetrabutoxy titanium. The mixture was heated to a temperature controlled to 230° C. under a nitrogen atmosphere, to carry out an ester exchange reaction while distilling off the produced methanol. Subsequently, the temperature of the reaction system was gradually elevated to 255° C. to carry out a polycondensation reaction under a reduced pressure of 1 mmHg, whereby polyester A2 was obtained.

Acrylic Resin A1:

The acrylic resin A1 comprises 30 mol % of methyl methacrylate/30 mol % of 2-isopropenyl-2-oxazoline/10 mol % of polyethyleneoxide(n=10)methacrylate/30 mol % of acrylamide, with Tg (glass transition temperature) of 50°

TABLE 2

| Coat. material | Lubricity layer composition (w/t %) | | | | | | | | |
|---|---|---|---|---|---|---|---|---|---|
| | Polyester A1 | Polyester A2 | Acryl | Part. A1 | Part. A2 | Part. A3 | Part. A4 | Add. A1 | Wet. A1 |
| Coat. liquid A1 | 67 | | 20 | 3 | | | | 5 | 5 |
| Coat. liquid A2 | | 67 | 20 | 3 | | | | 5 | 5 |
| Coat. liquid A3 | 62 | | 20 | 3 | | 5 | | 5 | 5 |
| Coat. liquid A4 | 67 | | 20 | | 3 | | | 5 | 5 |
| Coat. liquid A5 | 67 | | 20 | | | | 3 | 5 | 5 |

Coat. = Coating
Part. = Inert particles
Add. = Additives
Wet. = Wetting agents

C. The acrylic resin was prepared in accordance with the procedure shown in Production Examples 1 to 3 of Kokai (Jpn. Unexamined Patent Publication) 63-37167, as follows:

302 parts of ion exchanged water were charged into a four-neck flask, and was heated to 60° C. under a nitrogen stream, followed by an addition of 0.5 parts of ammonium persulfate and 0.2 parts of sodium hydrogen nitrite, as polymerization initiators. Further, a mixture of monomers comprising 23.3 parts of methyl methacrylate, 22.6 parts of 2-isopropenyl-2-oxazoline, 40.7 parts of polyethyleneoxide (n=10)methacrylate, and 13.3 parts of acrylamide were dropped for three hours, adjusting the temperature of the liquid to be in the range between 60 to 70° C. The temperature range was maintained after the completion of the dropping for two hours, to maintain the reaction under stirring. The reactants were subsequently cooled to obtain an aqueous dispersion of acrylic resin A1 containing 25% of a solid component.

Inert Particles A1:

Inert particles A1 comprise composite inorganic particles of silica and titania, having an average particle size of 100 nm. The particles were prepared, in accordance with the procedure shown in Production Examples and Working Examples of Kokai (Jpn. Unexamined Patent Publication) 7-2520, as follows;

140 g of methanol, 260 g of isopropanol and 100 g of aqueous ammonia (25 w/t %) were charged into a glass reactor having stirring impellers and with an inner volume of 4 litters to prepare a reaction liquid. The reaction liquid was maintained at 40° C. with stirring. Then, into a 3 litter triangular flask were charged 542 g of a silicon tetramethoxide [Si(OMe)$_4$, supplied by Colcoat; trade name: METHYLSILICATE 39], followed by an addition under stirring of 195 g of methanol and 28 g of 0.1 w/t % aqueous hydrochloric acid solution (35% hydrochloric acid, supplied by Wako Jyunyaku Kogyo Sha, and was diluted with water to $\frac{1}{1000}$ solution), and the mixture was stirred for about 10 minutes. Subsequently, a liquid comprising titanium tetraisopropoxide [Ti (O-i-Pr)$_4$, supplied by Nippon Soda KK with a trade name of A-1 (TPT)] diluted with 634 g of isopropanol, to obtain a transparent uniform solution(co-condensation product of silicon tetraalkoxide and titanium tetraalkoxide). Each of 1,669 g of the uniform solution and 480 g of the aqueous ammonia (25 w/t %) was simultaneously dropped into the reaction liquid for two hours such that the dropping speed was slow at the start and the speed was increased at the ending stage. After the completion of the drop, the obtained co-hydrolyzate was filtered while the organic solvent was dried at 50° C., and was dispersed in water to obtain inert particles A1 having a concentration of 10% by weight and a refractive index of 1.56.

Inert Particles A2:

Acrylic filler having an average particle size of 100 nm and a refractive index of 1.50, supplied by Nippon Paint KK with a trade name of MICROJELL E-1002

Inert Particles A3:

Acrylic filler having an average particle size of 30 nm and a refractive index of 1.50, supplied by Nippon Paint KK with a trade name of MICROJELL E-2002

Inert Particles A4:

Acrylic filler having an average particle size of 200 nm and a refractive index of 1.42, supplied by Nissan Kagaku KK with a trade name of MP-2040

Additive A1:

Carnauba wax supplied by Chukyo Yushi KK with a trade name of SELOSOL 524

Wetting agent A1: polyoxyethylene (n=7) lauryl ether supplied by Sanyo Kasei KK with a tradename of NARO-ACTY-N-70

TABLE 3

| Coating materials | Refractive index of the mixture of high molecular binders |
|---|---|
| Coating liquid A1 | 1.57 |
| Coating liquid A2 | 1.56 |
| Coating liquid A3 | 1.57 |
| Coating liquid A4 | 1.57 |
| Coating liquid A5 | 1.57 |

Example 11

Melted polyethylene-2,6-naphthalate ([η]=0.65 dl/g, Tg=121° C.) was extruded from a die and was cooled in a cooling drum by a conventional process to form a not-yet stretched film, followed by stretching the film to the longitudinal direction by 3.4-fold. Subsequently, an aqueous coating liquid containing an 8% concentration of the coating film composition (coating liquid shown in Table 2). The coated film was dried at 105° C., stretched by 3.6-fold to a crosswise direction at 140° C., contracted by 3% to the width direction at 230° C. and heat-fixed whereby a laminated film for optical use having a thickness of 125 μm was obtained. The thickness of the coating film is 0.10 μm. Evaluation results of the film are shown in Table 4.

TABLE 4

| | Coat. materials | Scratch Res.* | Haze | (1)* | (2)* | H. coat | Adhesive (PSA) | (3)* | (4)* |
|---|---|---|---|---|---|---|---|---|---|
| Ex. 8 | Coat. liquid A1 | 4 | ⊚ | 0.007 | ○ | 5 | 5 | ○ | ○ |
| Ex. 9 | Coat. liquid A2 | 4 | ⊚ | 0.007 | ○ | 5 | 5 | ○ | ○ |
| Ex. 10 | Coat. liquid A3 | 5 | ⊚ | 0.009 | ⊚ | 5 | 5 | ⊚ | ⊚ |
| Ex. 11 | Coat. liquid A1 | 4 | ⊚ | 0.007 | ○ | 5 | 5 | ○ | ○ |
| Comp. Ex. 5 | Coat. liquid A4 | 4 | Δ | 0.007 | ○ | 5 | 5 | ○ | Δ |
| Comp. Ex. 6 | Coat. liquid A5 | 2 | X | 0.012 | ⊚ | 5 | 5 | ⊚ | X |

Ex. = Example;
Comp. Ex. = Comparative Example
Scratch res.* = Scratch resistance;

TABLE 4-continued

|  | Coat. materials | Scratch Res.* | Haze | (1)* | (2)* | H. coat | Adhesion Adhesive (PSA) | (3)* | (4)* |
|---|---|---|---|---|---|---|---|---|---|

(1)* = Surface roughness (Ra) (μm)
(2)* = Frictional coefficient (μs);
H. coat* = Hard coat;
(3)* = Blocking resistance;
(4)* = General evaluation Examples 12 to 20 and Comparative Examples 7 to 9

Melted polyethylene terephthalate ([η]=0.62 dl/g, Tg=78° C.) was extruded from a die and was cooled in a cooling drum by a conventional process to form a not-yet stretched film, followed by stretching the film to the longitudinal direction by 3.2-fold. Subsequently, an aqueous coating liquid containing a 6% concentration of the coating materials shown in Table 5 was applied to both surfaces of the stretched film by a roll coater. For Comparative Example 3, no coating layer was formed.

The coated film was dried at 95° C., stretched by 3.5-fold to a crosswise direction at 120° C., contracted by 3% to the width direction at 220° C. and heat-fixed whereby a laminated film for optical use having a thickness of 125 μm was obtained. The thickness of the coating film is 0.06 μm. Evaluation results of the film are shown in Table 6.

mixture was heated to a temperature controlled to 230° C. under a nitrogen atmosphere, to carry out an ester exchange reaction while distilling off the produced methanol. Then, the temperature of the reaction system was gradually elevated to 255° C. in a polymerization tank provided with a stirring device having a high motor torque to carry out a polycondensation reaction under a reduced pressure of 1 mmHg, whereby polyester resin B1 having an intrinsic viscosity of 0.56 was obtained. 25 parts of the resulted polyester was dissolved in 75 parts of tetrahydrofuran. To the resulted solution were added dropwise 75 parts of water under a high speed stirring of 10,000 rotation/min, to obtain a dispersion having a milky white color. The dispersion was distilled under a reduced pressure of 20 mmHg to distill tetrahydrofuran off. An aqueous dispersion of polyester resin B1 was obtained.

TABLE 5

| | Composition (w/t %) of coating layer | | | | | | | | | | |
|---|---|---|---|---|---|---|---|---|---|---|---|
| | C.L. B1 | C.L. B2 | C.L. B3 | C.L. B4 | C.L. B5 | C.L. B6 | C.L. B7 | C.L. B8 | C.L. B9 | C.L. B10 | C.L. B11 |
| Polyester Resin B1 | 80 | 80 | 80 | 80 | 80 | 80 | | | | | |
| Polyester Resin B2 | | | | | | | 80 | 80 | 80 | | |
| Polyester Resin B3 | | | | | | | | | | 80 | 90 |
| Acryl B1 | 10 | | | | 10 | 10 | 10 | 10 | 10 | 10 | |
| C. linker B2 | | 10 | | | | | | | | | |
| C. linker B3 | | | 10 | | | | | | | | |
| C. linker B4 | | | | 10 | | | | | | | |
| Part. B1 | 2 | 2 | 2 | 2 | | | 2 | | | | |
| Part. B2 | | | | | 2 | | | 2 | | 2 | 2 |
| Part. B3 | | | | | | 2 | | | 2 | | |
| Add. B1 | 5 | 5 | 5 | 5 | 5 | 5 | 5 | 5 | 5 | 5 | 5 |
| Wet. B1 | 3 | 3 | 3 | 3 | 3 | 3 | 3 | 3 | 3 | 3 | 3 |

C.L = Coating liquid;
C. linker = Cross linker
Part. = Inert particles;
Add. = Additive
Wet. = Wetting agent Components composing coating liquids B1 to B11 were prepared as follows:

Polyester Resin B1:

The polyester resin B1 comprises, as acid components, 75 mol % of 2,6-naphthalene dicarboxylic acid/20 mol % of isophthalic acid/5 mol % of 5-sodium sulfoisophthalic acid and, as glycol components, 90 mol % of ethylene glycol/10 mol % of diethylene glycol, with Tg of 80° C. and an average molecular weight of 12,000. The polyester resin B1 was prepared as follows:

51 parts of dimethyl 2,6-sodium dicarboxylate, 11 parts of dimethyl isophthalate, 4 parts of dimethyl 5-sodium sulfoisophthalate, 31 parts of ethylene glycol and 2 parts of diethylene glycol were charged into a reactor, followed by an addition of 0.05 parts of tetrabutoxy titanium. The Polyester Resin B2:

The polyester resin B2 comprises, as acid components, 95 mol % of terephthalic acid/5 mol % of 5-sodium sulfoisophthalic acid and, as glycol components, 90 mol % of ethylene glycol/10 mol % of diethylene glycol, with Tg of 72° C. and an average molecular weight of 16,000. The polyester resin B2 was prepared as follows:

56 parts of dimethyl terephthalate, 5 parts of dimethyl 5-sodium sulfoisophthalate, 36 parts of ethylene glycol and 3 parts of diethylene glycol were charged into a reactor, followed by an addition of 0.05 parts of tetrabutoxy titanium. The mixture was heated to a temperature controlled to 230° C. under a nitrogen atmosphere, to carry out an ester exchange reaction while distilling off the produced methanol. Subsequently, the reaction system in a polymerization tank with a stirring device having a high motor torque was gradually heated to 255° C. to carry out a polycondensation reaction under a reduced pressure of 1 mmHg, whereby the polyester resin B2 having an intrinsic viscosity of 0.57 was obtained. 25 parts of this polyester resin B2 was dissolved in 75 parts of tetrahydrofuran. To the resulted solution were added dropwise 75 parts of water under a high speed stirring of 10,000 rotations/min, to obtain a dispersion having a milky white color. The dispersion was distilled under a reduced pressure of 20 mmHg to distill off the tetrahydrofuran. An aqueous dispersion of polyester resin B2 was obtained.

Polyester Resin B3:

The polyester resin B3 comprises, as acid components, 75 mol % of 2,6-naphthalene dicarboxylic acid/20 mol % of isophthalic acid/5 mol % of 5-sodium sulfoisophthalic acid and, as glycol components, 90 mol % of ethylene glycol/10 mol % of diethylene glycol, with Tg of 80° C. and an average molecular weight of 10,000. The polyester resin B3 was prepared as follows:

51 parts of dimethyl 2,6-naphthalne dicarboxylate, 11 parts of dimethyl isophthalate, 4 parts of dimethyl isophthalate, 31 parts of ethylene glycol and 2 parts of diethylene glycol were charged into a reactor, followed by an addition of 0.05 parts of tetrabutoxy titanium. The mixture was heated to a temperature controlled to 230° C. under a nitrogen atmosphere, to carry out an ester exchange reaction while distilling off the produced methanol. Subsequently, the temperature of the reaction system in a polymerization tank with a stirring device having a high motor torque was gradually elevated to 255° C. to carry out a polycondensation reaction under a reduced pressure of 1 mmHg, whereby the polyester resin B3 having an intrinsic viscosity of 0.57 was obtained. 25 parts of this polyester resin B3 was dissolved in 75 parts of tetrahydrofuran. To the resulted solution were added dropwise 75 parts of water under a high speed stirring of 10,000 rotations/min, to obtain a dispersion having a milky white color. The dispersion was distilled under a reduced pressure of 20 mmHg to distill off the tetrahydrofuran. An aqueous dispersion of polyester resin B3 was obtained.

Acrylic Resin B1:

The acrylic resin B1 comprises 30 mol % of methyl methacrylate/3.0 mol % of 2-isopropenyl-2-oxazoline/10 mol % of polyethyleneoxide(n=10)methacrylate/30 mol % of acrylamide, with Tg of 50° C. The acrylic resin B1 was prepared, in accordance with the procedure shown in Production Examples 1 to 3 of Kokai (Jpn. Unexamined Patent Publication) 63-37167, as follows:

302 parts of ion exchanged water were charged into a four-neck flask, and was heated to 60° C. under a nitrogen stream, followed by an addition of 0.5 parts of ammonium persulfate and 0.2 parts of sodium hydrogen nitrite, as polymerization initiators. Further, a mixture of monomers comprising 23.3 parts of methyl methacrylate, 22.6 parts of 2-isopropenyl-2-oxazoline, 40.7 parts of polyethyleneoxide (n=10)methacrylate, and 13.3 parts of acrylamide was dropped for three hours, adjusting the temperature of the liquid to be in the range between 60 to 70° C. The temperature range was maintained after the completion of the dropping for two hours, to maintain the reaction under stirring. The reactants were subsequently cooled to obtain an aqueous dispersion of acrylic resin B1 containing 25% of a solid component. The acrylic resin B1 contains 30 mol % of 2-idoptoprnyl-2-oxazoline as a cross-linker, based on the amount of the acrylic resin B1.

Cross-Linker B2:

Methylol-melamine produced by Sanwa Chemical KK, with a trade name of MX-035

Cross-Linker B3:

Glycerol polyglycidyl ether produced by Nagase Chemitex KK, with a trade name of DENACOL EX-313

Cross-Linker B4:

Block isocyanate produced by Daiichi Kogyo Seiyaku KK, with a trade name of ELASTRON BN-5

Inert Particles B1:

Inert particles B2 comprise composite inorganic particles of silica and titania, having an average particle size of 100 nm. The particles were prepared, in accordance with the procedure shown in Production Examples and Working Examples of Kokai (Jpn. Unexamined Patent Publication) 7-2520, as follows:

140 g of methanol, 260 g of isopropanol, and 100 g of aqueous ammonia (25 w/t %) were charged into a glass reactor having stirring impellers and with an inner volume of 4 litters, to prepare a reaction liquid. The temperature of the reaction liquid was maintained at 40° C. with stirring. Then, into a 3 litter triangular flask were charged 542 g of silicon tetramethoxide[Si(OMe)$_4$, supplied by Colcoat; trade name: METHYLSILICATE 39], followed by an addition under stirring of 195 g of methanol and 28 g of 0.1 w/t % aqueous hydrochloric acid solution(35% hydrochloric acid, supplied by Wako Jyunyaku Kogyo KK, was diluted with water to a $\frac{1}{1000}$ solution), and the mixture was stirred for about 10 minutes. Subsequently, a liquid comprising 300 g of titanium tetraisopropoxide [Ti(O-i-Pr)$_4$, supplied by Nippon Soda KK with a trade name of A-1 (TPT)] diluted with 634 g of isopropanol was added, to obtain a transparent uniform solution (co-condensation product of silicon tetraalkoxide and titanium tetraalkoxide). Each of 1,669 g of the uniform solution and 480 g of the aqueous ammonia (25 w/t %) was simultaneously dropped into the reaction liquid for two hours such that the dropping speed was slow at the start and the speed was increased at the ending stage. After the completion of the drop, the obtained co-hydrolyzate was filtered while the organic solvent was dried at 50° C., and was dispersed in water to obtain the inert particles B1 having a concentration of 10% by weight.

Fine Particles B2:

Silica filler having an average particle size of 80 nm produced by Shokubai Kasei Kogyo KK, with a trade name of CARALOID S1-80P Fine Particles B3:

Acrylic filler having an average particle size of 80 nm produced by Nippon Shokubai KK, with a trade name of MX-80W Additive B1:

Carnauba WAX produced by Chukyo Yushi KK, with a trade name of SELOSOL 524

Wetting Agent B1:

Polyoxyethylene (n=7) lauryl ether produced by Sanyo Kasei KK, with a trade name of NAROACTY N-70

TABLE 6

| | Coating materials | Haze | Surface roughness (Ra) (μm) | F. coeffcient (μs) | Adhesion to hard coat | Blocking resistance | Heat resistance |
|---|---|---|---|---|---|---|---|
| Ex. 12 | C.L. B1 | ◎ | 0.007 | ◎ | 5 | ◎ | ◎ |
| Ex. 13 | C.L. B2 | ◎ | 0.007 | ◎ | 5 | ◎ | ○ |
| Ex. 14 | C.L. B3 | ◎ | 0.007 | ◎ | 5 | ○ | ○ |
| Ex. 15 | C.L. B4 | ◎ | 0.007 | ○ | 5 | ○ | ○ |
| Ex. 16 | C.L. B5 | ○ | 0.005 | ○ | 5 | ○ | ◎ |
| Ex. 17 | C.L. B6 | ○ | 0.005 | ○ | 5 | ○ | ◎ |
| Ex. 18 | C.L. B7 | ◎ | 0.007 | ◎ | 5 | ◎ | ◎ |
| Ex. 19 | C.L. B8 | ○ | 0.005 | ○ | 5 | ○ | ◎ |
| Ex. 20 | C.L. B9 | ○ | 0.005 | ○ | 5 | ○ | ◎ |
| Ex. 21 | C.L. B1 | ◎ | 0.007 | ◎ | 5 | ◎ | ◎ |
| Ex. 22 | C.L. B7 | ◎ | 0.007 | ◎ | 5 | ◎ | ◎ |
| C. Ex. 7 | C.L. B10 | ○ | 0.005 | ○ | 5 | ○ | X |
| C. Ex. 8 | C.L. B11 | ○ | 0.004 | ○ | 5 | △ | X |
| C. Ex. 9 | None | ◎ | 0.002 | X | 1 | ◎ | X |

Ex. = Example;
C. Ex. = Comparative Example
C.L. = Coating liquid

Examples 21 and 22

Melted polyethylene-2,6-naphthalate ([η]=0.65 dl/g, Tg=121° C.) was extruded from a die and was cooled in a cooling drum by a conventional process to form a not-yet stretched film, followed by stretching the film to the longitudinal direction by 3.4-fold. Subsequently, an aqueous coating liquid containing a 6% concentration of the coating materials shown in Table 5 was applied to both surfaces of the stretched film by a roll coater.

The coated film was dried at 105° C., stretched by 3.6-fold to a crosswise direction at 140° C., contracted by 3% to the width direction at 230° C. and heat-fixed whereby a laminated film for optical use having a thickness of 125 μm was obtained. The thickness of the coating film is 0.06 μm. Evaluation results of the film are shown in Table 6.

Technical Effect of the Invention

According to the invention, there is obtained a laminated film for optical use which is improved in uniformity, transparency, lubricity, color tone and scratch resistance, which deposits only a reduced amount of low molecular materials, and which is excellent in the adhesion to a layer adopted for various optical purposes.

What is claimed is:

1. A laminated film for optical use comprising a polyester film which has a lubricity layer containing globular particles in at least one side thereof, wherein the laminated film has a thickness irregularity of 0.5 to 7.0%, and wherein the polyester film contains inert particles derived from catalysts and the amount of the inert particles determined by a dark-field microscopy satisfies the following conditions:
   the number of inert particles having a particle size of from 1 to 10 μm is 200 to 20,000/mm²; and
   the number of inert particles having a particle size of greater than 10 μm is 10/mm² or less.

2. The laminated film for optical use according to claim 1, wherein the inert particles are those of at least one element selected from the group consisting of manganese, magnesium, calcium, lithium, sodium, potassium, antimony, germanium, titanium and phosphorous.

3. The laminated film for optical use according to claim 1, wherein the lubricity layer contains globular inorganic particles and/or organic particles.

4. The laminated film for optical use according to claim 1, wherein the haze value is from 0.3 to 1.5%.

5. The laminated film for optical use according to claim 1, wherein the color*b value determined by permeated light is −0.5 to 1.5.

6. The laminated film for optical use according to claim 1, wherein a blue-base dye or pigment is contained in the polyester film or lubricity layer.

7. The laminated film for optical use according to claim 1, wherein the polyester film is a biaxially oriented polyester film.

8. The laminated film for optical use according to claim 1, wherein the lubricity layer further contains a binder comprising a polyester resin, and wherein the difference in refractive index of the binder comprising the polyester resin and that of the globular particles is within 0.02.

9. The laminated film for optical use according to claim 8, wherein both the binder comprising the polyester resin and the globular particles have refractive indexes in the range between 1.50 and 1.60.

10. The laminated film for optical use according to claim 8, wherein the binder comprising the polyester resin comprises a mixture of the polyester resin with an acrylic resin containing oxazoline groups and polyalkylene oxide chains.

11. The laminated film for optical use according to claim 8, wherein the lubricity layer further contains aliphatic wax.

12. The laminated film for optical use according to claim 8, wherein the average roughness (Ra) at the center line of the lubricity layer surface is from 0.002 to 0.01 μm, and wherein the frictional coefficient(μs) at the lubricity layer surface is 0.8 or less.

13. The laminated film for optical use according to claim 8, wherein the binder comprising the polyester resin comprises the polyester resin which has a glass transition point of 40 to 100° C. and an intrinsic viscosity of 0.4 or greater and less than 0.7.

14. The laminated film for optical use according to claim 1, wherein the globular particles are composite inorganic particles of silica and titania and where the average particle size of the composite inorganic particles is from 20 to 200 nm.

* * * * *